(12) United States Patent
Choi et al.

(10) Patent No.: US 11,360,305 B2
(45) Date of Patent: Jun. 14, 2022

(54) OPTICAL SYSTEM AND WEARABLE DISPLAY APPARATUS HAVING THE SAME

(71) Applicant: SAMSUNG ELECTRONICS CO., LTD., Suwon-si (KR)

(72) Inventors: Myong-jo Choi, Hwaseong-si (KR); Kyu-sub Kwak, Seoul (KR); Jae-eun Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 304 days.

(21) Appl. No.: 16/162,001

(22) Filed: Oct. 16, 2018

(65) Prior Publication Data
US 2019/0187472 A1 Jun. 20, 2019

(30) Foreign Application Priority Data
Dec. 18, 2017 (KR) .......................... 10-2017-0173927

(51) Int. Cl.
*G02B 27/14* (2006.01)
*G02B 27/01* (2006.01)
(Continued)

(52) U.S. Cl.
CPC .......... *G02B 27/0172* (2013.01); *G02B 5/30* (2013.01); *G02B 27/0081* (2013.01);
(Continued)

(58) Field of Classification Search
CPC .. G02B 5/30; G02B 27/0172; G02B 27/0081; G02B 27/0944; G02B 27/0905;
(Continued)

(56) References Cited

U.S. PATENT DOCUMENTS

| 8,094,377 B2 | 1/2012 | Kessler et al. |
| 9,435,955 B2 | 9/2016 | Dubroca et al. |

(Continued)

FOREIGN PATENT DOCUMENTS

| JP | 3531546 B2 | 5/2004 |
| JP | 4100276 B2 | 6/2008 |

(Continued)

OTHER PUBLICATIONS

Communication dated Oct. 7, 2019 issued by the Korean Intellectual Property Office in counterpart English Korean Application No. 10-2017-0173927.

(Continued)

*Primary Examiner* — Mahidere S Sahle
(74) *Attorney, Agent, or Firm* — Sughrue Mion, PLLC

(57) ABSTRACT

An optical system is provided which includes a light source which outputs light; a first waveguide; a transmissive reflective layer provided on a top surface of the first waveguide and configured to reflect some light and transmit the remaining light incident thereon; a second waveguide provided on a top surface of the transmissive reflective layer; an in-coupler provided on the first waveguide and configured to allow the light output by the light source to enter the first waveguide; and an out-coupler provided on one of the first waveguide and the second waveguide and configured to emit light from the optical system.

12 Claims, 16 Drawing Sheets

(51) Int. Cl.
  *G02B 27/09* (2006.01)
  *G02B 27/28* (2006.01)
  *H04N 9/31* (2006.01)
  *G02B 5/30* (2006.01)
  *G02F 1/01* (2006.01)
  *G02F 1/29* (2006.01)
  *G02B 27/00* (2006.01)

(52) U.S. Cl.
  CPC ..... *G02B 27/0176* (2013.01); *G02B 27/0905* (2013.01); *G02B 27/0944* (2013.01); *G02B 27/286* (2013.01); *G02F 1/0126* (2013.01); *G02F 1/293* (2013.01); *H04N 9/315* (2013.01); *G02B 2027/0174* (2013.01)

(58) Field of Classification Search
  CPC .............. G02B 27/286; G02B 27/0176; G02B 2027/0174; G02F 1/0126; G02F 1/293; H04N 9/315
  USPC .................................... 359/32, 630, 637, 640
  See application file for complete search history.

(56) References Cited

U.S. PATENT DOCUMENTS

| | | | |
|---|---|---|---|
| 10,025,009 B2 | 7/2018 | Yamada et al. | |
| 10,571,699 B1* | 2/2020 | Parsons | G02B 27/0172 |
| 2002/0025113 A1 | 2/2002 | Wang et al. | |
| 2002/0176173 A1 | 11/2002 | Song | |
| 2003/0090632 A1 | 5/2003 | Kim et al. | |
| 2005/0030479 A1 | 2/2005 | Aruga | |
| 2014/0140654 A1* | 5/2014 | Brown | G02B 27/0172 385/10 |
| 2014/0204438 A1 | 7/2014 | Yamada et al. | |
| 2014/0334777 A1 | 11/2014 | Dubroca et al. | |
| 2016/0349508 A1 | 12/2016 | Horikawa | |
| 2017/0293145 A1 | 10/2017 | Miller et al. | |
| 2020/0096767 A1* | 3/2020 | Basset | G06F 3/013 |
| 2020/0312040 A1* | 10/2020 | Schowengerdt | G02B 27/0172 |

FOREIGN PATENT DOCUMENTS

| | | |
|---|---|---|
| JP | 2014-142386 A | 8/2014 |
| JP | 2015-161737 A | 9/2015 |
| KR | 2003-0017941 A | 3/2003 |
| KR | 10-0403599 B1 | 10/2003 |
| KR | 10-2014-0102258 A | 8/2014 |
| KR | 10-2015-0023712 A | 3/2015 |
| KR | 10-2016-0104235 A | 9/2016 |
| KR | 10-1732880 B1 | 5/2017 |
| WO | 2013/188085 A1 | 12/2013 |
| WO | 2017037708 A1 | 3/2017 |

OTHER PUBLICATIONS

Communication dated Dec. 6, 2018, issued by the Korean Intellectual Property Office in counterpart Korean Application No. 10-2017-0173927.

Search Report dated Mar. 15, 2019, issued by the International Searching Authority in International Application No. PCT/KR2018/014380 (PCT/ISA/210).

Written Opinion dated Mar. 15, 2019, issued by the International Searching Authority in International Application No. PCT/KR2018/014380 (PCT/ISA/237).

Communication dated May 20, 2019, issued by the Korean Patent Office in counterpart Korean Application No. 10-2017-0173927.

* cited by examiner

OPTICAL SYSTEM AND WEARABLE DISPLAY APPARATUS HAVING THE SAME

CROSS-REFERENCE TO RELATED APPLICATIONS

This application claims priority under 35 U.S.C. § 119 from Korean Patent Application No. 10-2017-0173927, filed on Dec. 18, 2017, in the Korean Intellectual Property Office, the disclosure of which is incorporated by reference herein in its entirety.

BACKGROUND

1. Field

Apparatuses and methods consistent with exemplary embodiments relate to an optical system including a waveguide capable of transmitting light and a wearable display apparatus having the same.

2. Description of the Related Art

A wearable display apparatus for providing augmented reality is generally implemented using a head mounted display (HMD) or smart glasses.

Such a wearable display apparatus typically requires an ultra-small and ultra-thin shape while having a wide angle of view and high resolution.

In a wearable display apparatus for implementing such augmented reality, a waveguide is used to guide an image output from a projecting part to a user's eye.

Also, a laser scanning projector using a laser as a light source may be used as the projecting part. The laser scanning projector projects light with a very small diameter.

The waveguide, used to guide the image from the projecting part to the user's eye, is formed so that the thickness of the waveguide is substantially equal to the diameter of the light output from the projecting part. When the diameter of the light entering the waveguide is smaller than the thickness of the waveguide, a portion of the image output from the waveguide is not visible to the user. In other words, a dark portion is present in the image output from the waveguide.

In order to solve this problem, it is possible to consider reducing the thickness of the waveguide, but the physical limitations of the waveguide must be considered.

Therefore, a separate optical system for enlarging the diameter of the light, for example, a beam expander, may be used so that the diameter of the light output from the projecting part is substantially equal to the thickness of the waveguide.

However, when the separate optical system is used in order to enlarge the diameter of the light incident on the waveguide as described above, there is a problem that the size of the wearable display apparatus becomes large, thus limiting its portability.

SUMMARY

One or more exemplary embodiments may overcome the above drawbacks and other problems associated with the conventional arrangement. One or more exemplary embodiments may provide an optical system including a waveguide capable of minimizing a dark portion of an output image regardless of a diameter of light incident on the waveguide, and a wearable display apparatus having the optical system.

In accordance with an aspect of an exemplary embodiment, an optical system may include a light source configured to output light; a first waveguide configured to guide light; a transmissive reflective layer provided on a top surface of the first waveguide and configured to reflect some light incident thereon and to transmit come light incident thereon; a second waveguide provided on a top surface of the transmissive reflective layer and configured to guide light; an in-coupler provided on the first waveguide and configured to guide light output by the light source into the first waveguide; and an out-coupler provided on one of the first waveguide and the second waveguide and configured to emit light incident thereon to an outside.

The optical system may include at least one additional waveguide and at least one additional transmissive reflective layer provided between the transmissive reflective layer and the second waveguide.

A size of the transmissive reflective layer may be different from a size of the at least one additional transmissive reflective layer.

The transmissive reflective layer may cover less than an entirety of an upper surface of the first waveguide.

The transmissive reflective layer may be provided at a position corresponding to a position of the in-coupler.

The transmissive reflective layer may cover an entirety of the upper surface of the first waveguide.

The in-coupler and the out-coupler may be both provided on the first waveguide.

The in-coupler may include an inclined surface formed at one end of the first waveguide.

The in-coupler may include a prism provided in the first waveguide.

The in-coupler and the out-coupler may include one of a diffractive optical element, a polarization selective coating, and a prism.

In accordance with an aspect of another exemplary embodiment, a method of guiding light in a waveguide including a first waveguide, a transmissive reflective layer, a second waveguide, an in-coupler, and an out-coupler, the method of guiding light may include transmitting light through the in-coupler, thereby causing the light to be incident on the transmissive reflective layer; directing some the light incident on the transmissive reflective layer to be incident on the first waveguide, directing some light incident on the transmissive reflective layer through the transmissive reflective layer to be incident on the second waveguide; causing light incident on the first waveguide to be totally internally reflected within the first waveguide and thereby incident on the transmissive reflective layer; causing light incident on the second waveguide to be totally internally reflected within the second waveguide and thereby incident on the transmissive reflective layer; and causing light traveling through the first waveguide and the second waveguide to be refracted by the out-coupler and thereby be emitted from the waveguide.

In accordance with an aspect of another exemplary embodiment, a wearable display apparatus may include a projecting part configured to output light forming an image; and an optical system configured to guide the light emitted from the projecting part, wherein the optical system may include a first waveguide configured to guide light; a transmissive reflective layer provided on a top surface of the first waveguide and configured to reflect some light incident thereon and to transmit some light incident thereon; a second waveguide provided on a top surface of the transmissive reflective layer and configured to guide light; an in-coupler provided on the first waveguide and configured to guide light emitted from the projecting part into the first waveguide; and an out-coupler provided on one of the first waveguide and the second waveguide and configured to emit light incident thereon.

The wearable display apparatus may include a head mounted display or a smart glasses.

Other objects, advantages and salient features of exemplary embodiments will become apparent from the following detailed description, taken in conjunction with the annexed drawings.

BRIEF DESCRIPTION OF THE DRAWINGS

These and/or other aspects and advantages of will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments will be described in detail with reference to the accompanying drawings.

The matters defined herein, such as a detailed constructions and elements thereof, are provided to assist in a comprehensive understanding of the exemplary embodiments. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms "first," "second," etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

Figure 1:
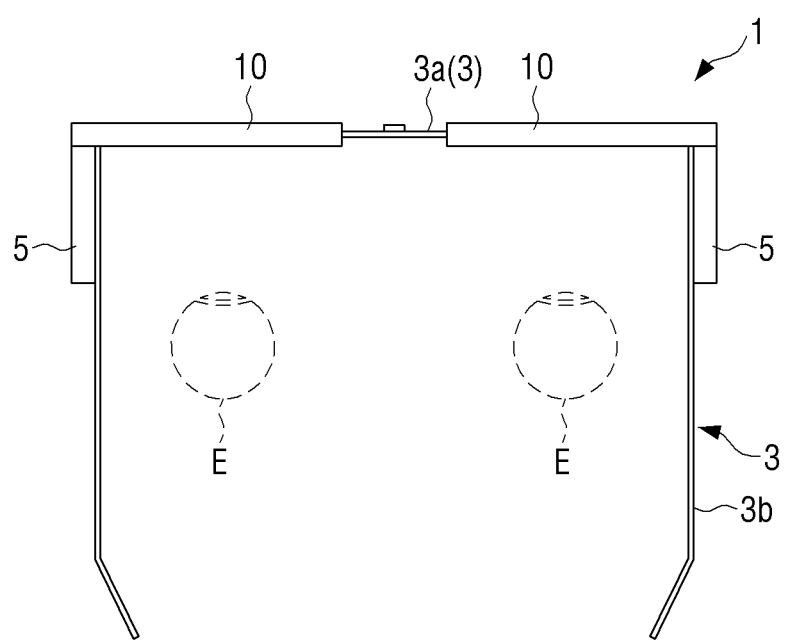
FIG. 1 is a view conceptually illustrating a wearable display apparatus having a waveguide according to an exemplary embodiment.

FIG. 1 is a view conceptually illustrating a wearable display apparatus having a waveguide according to an exemplary embodiment.

Referring to FIG. 1, a wearable display apparatus 1 according to an exemplary embodiment may include a supporting part 3, a projecting part 5, and a waveguide 10.

The supporting part 3 supports the projecting part 5 and the waveguide 10 and may be formed in the shape of glasses to be worn on a user's face. The supporting part 3 may include a body portion 3a to be positioned in front of the user's eyes E and a pair of legs 3b provided at both ends of the body portion 3a.

In FIG. 1, the supporting part 3, together with a pair of waveguides 10, form a pair of glasses. However, as another example, although not illustrated, the supporting part 3 may be configured to be mountable on the user's head, such as a head mounted display (HMD).

The projecting part 5 is a device for projecting light for forming an augmented reality image. A variety of image projection devices such as a laser scanning projector, a micro display projector, a digital light processing (DLP) projector, and the like may be used as the projecting part 5. A projecting part 5 may be provided on each of the legs 3b of the supporting part 3.

In the case of the present exemplary embodiment, a laser scanning projector is used as each of the pair of projecting parts 5. The diameter of the light output from the laser scanning projector may be less than the thickness of the waveguide 10. Here, the term "diameter of the light" refers to the diameter of the light spot formed on the incident surface when the light enters the waveguide 10.

The waveguide 10 may comprise a pair of waveguides, as shown in FIG. 1, and each waveguide 10 guides the light projected from a corresponding projecting part 5 to the user's eye E and may be provided on the body portion 3a of the supporting part 3. Each waveguide 10 may include an in-coupler for receiving the light projected from the corresponding projecting part 5 and an out-coupler for emitting the light guided by the waveguide 10. The waveguides 10 may be formed of a transparent material so that the user can see through the waveguides 10.

The wearable display apparatus 1 shown in FIG. 1 is provided with two projecting parts 5 and two waveguides 10, supported by the supporting part 3, as shown. However, the wearable display apparatus 1 according to an exemplary embodiment of is not limited thereto. The wearable display apparatus 1 according to an exemplary embodiment may include only a single projecting part 5 and a single waveguide 10. In other words, the wearable display apparatus 1 may be configured by one projecting part 5 and one waveguide 10 provided on the left or right side of the supporting part 3 so as to fit the left eye E or the right eye E of the user.

Hereinafter, a waveguide 10 according to an exemplary embodiment will be described in detail with reference to FIGS. 2 and 3. The waveguide 10, together with a light source that generates light, may form an optical system.

Figure 2:
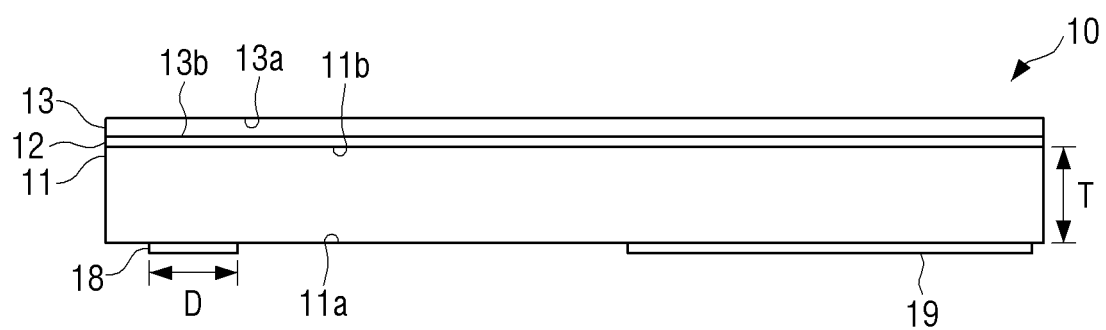
FIG. 2 is a cross-sectional view illustrating a waveguide according to an exemplary embodiment.

FIG. 2 is a cross-sectional view illustrating a waveguide according to an exemplary embodiment.

Referring to FIG. 2, the waveguide 10 according to an exemplary embodiment may include a first waveguide 11, a transmissive reflective layer 12, and a second waveguide 13.

The first waveguide 11 is formed to propagate the light incident on the in-coupler 18 and to emit the light to the outside through the out-coupler 19. In detail, the first waveguide 11 is formed such that the light incident on the in-coupler 18 is guided by internal reflection and is emitted through the out-coupler 19. [the reflection is not TOTAL as shown in FIG. 3]

The first waveguide 11 may include an outer surface 11a and an inner surface 11b. For example, one surface of the first waveguide 11 which is in contact with air, that is, the bottom surface of the first waveguide 11 in FIG. 2, is an outer surface 11a. Light internal to the waveguide 11, which is incident on the outer surface 11a in regions where the out-coupler is not located, is totally reflected therefrom. The surface opposite the outer surface 11a, that is the top surface 11b of the first waveguide 11 in FIG. 2, is an inner surface through which light may be transmitted.

The first waveguide 11 is formed of a transparent material through which incident light is guided.

The in-coupler 18 is provided on one surface of the first waveguide 11, that is, on the bottom side of the first waveguide 11 in FIG. 2. The in-coupler 18 refracts the light incident on the waveguide 10 from the projecting part 5 (see FIG. 3) to be transmitted into the waveguide 10 and to be totally internally reflected within the waveguide 10.

The in-coupler 18 may be formed in any of various ways as long as the in-coupler 18 can refract the light incident thereon so that it is totally internally reflected within the waveguide 10. For example, the in-coupler 18 may be implemented as a diffraction optical element (DOE), a hologram optical element (HOE), a micromirror, a mirror array, or the like. Further, the in-coupler 18 may be formed by a polarizing selective coating or a prism.

The in-coupler 18 may be formed to have a diameter D corresponding to the diameter of the light emitted from the projecting part 5. Therefore, the diameter D of the in-coupler 18 may be formed to be smaller than the thickness T of the first waveguide 11.

The out-coupler 19 is provided on one surface of the first waveguide 11, that is, on the outer surface 11a of the first waveguide 11 in FIG. 2, in a position laterally spaced with respect to the position of the in-coupler 18. The out-coupler 19 refracts the light propagated by total internal reflection inside the waveguide 10 such that the light is emitted toward the user's eye E. Accordingly, the light emitted through the out-coupler 19 forms parallel light—i.e. the emitted light is collimated.

The out-coupler 19 may be formed in any of a variety of ways as long as the out-coupler 19 can refract the light emitted therefrom toward the user's eye E. For example, the out-coupler 19 may be implemented as a diffraction optical element (DOE), a hologram optical element (HOE), a micro pattern, a mirror array, or the like. Further, the out-coupler 19 may be formed by a polarizing selective coating or a prism.

The diameter of the out-coupler 19 may correspond to the user's eye E. Therefore, the diameter of the out-coupler 19 may be larger than the diameter D of the in-coupler 18.

The transmissive reflective layer 12 is provided on the inner surface 11b of the first waveguide 11 and is formed so as to reflect a portion of the light incident thereon and to transmit a remaining portion of the light incident thereon. In other words, the transmissive reflective layer 12 is a partially reflective-partially transmissive structure that transmits some incident light and reflects the remaining incident light. The transmissive reflective layer 12 may be formed to cover the entire inner surface 11b side of the first waveguide 11. In other words, the transmissive reflective layer 12 may be formed in the same shape and size as the inner surface 11b of the first waveguide 11.

The transmissive reflective layer 12 may be formed of a metal coating formed by coating a metal such as gold, silver, or aluminum, a multilayer dielectric coating, a diffractive structure, or the like on the inner surface 11b of the first waveguide 11.

The second waveguide 13 is provided on the transmissive reflective layer 12 and is formed to internally reflect the light incident thereon through the transmissive reflective layer 12, thereby reflecting the light back to the transmissive reflective layer 12. The second waveguide 13 may include an outer surface 13a and an inner surface 13b. For example, an outer surface 13a of the second waveguide 13, which is in contact with air, that is, the top surface of the second waveguide 13 in FIG. 2 forms a total reflection surface at which the light transmitted through the transmissive reflective layer 12 is totally internally reflected, and the opposite surface of the second waveguide 13, that is, the bottom, inner surface 13b of the second waveguide 13 which is in contact with the transmissive reflective layer 12 in FIG. 2 forms an inner surface through which the light transmitted through the transmissive reflective layer 12 can be transmitted.

The second waveguide 13 may be formed of a transparent material through which incident light is guided. Accordingly, the second waveguide 13 may be formed of the same material as the first waveguide 11. Alternatively, the second waveguide 13 may be formed of a different material which is transparent and which has the same or similar refractive index as that of the first waveguide 11.

The second waveguide 13 may be formed to have a thickness different from that of the first waveguide 11. As an example, in the case of the embodiment illustrated in FIG. 2, the second waveguide 13 is formed to have the thickness thinner than that of the first waveguide 11.

The operation of the waveguide 10 according to an exemplary embodiment having the above-described structure will be described with reference to FIG. 3.

Figure 3:
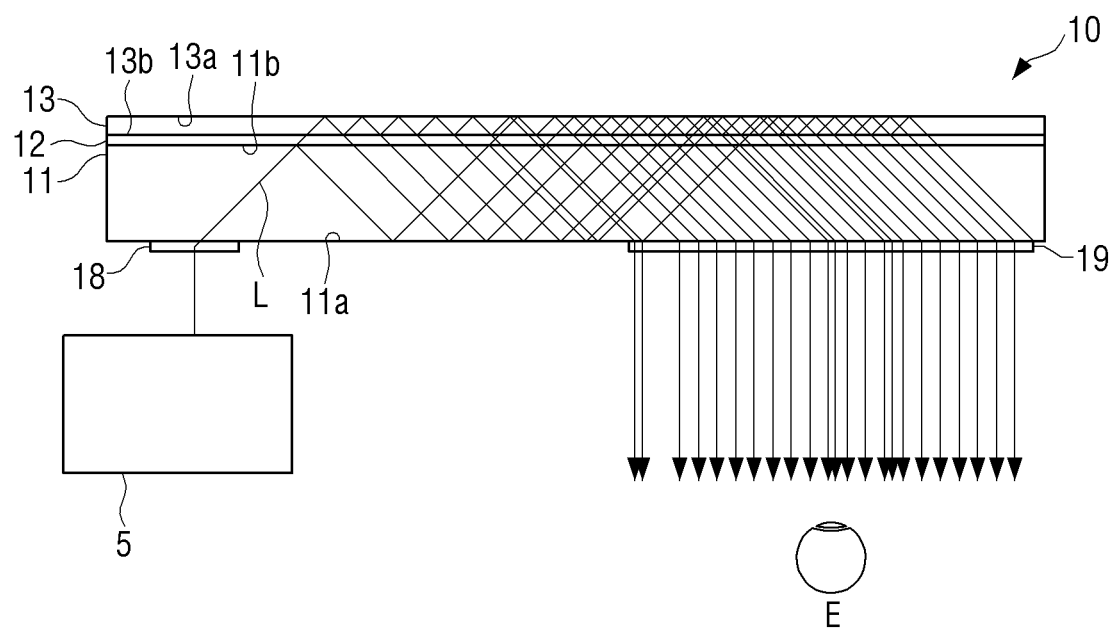
FIG. 3 is a view illustrating light guided by the waveguide of FIG. 2.

FIG. 3 is a view schematically illustrating light guided by the waveguide of FIG. 2.

Referring to FIG. 3, light L emitted from the projecting part 5 is incident on the in-coupler 18 of the waveguide 10.

The light transmitted through the in-coupler 18 is refracted by the in-coupler 18 so that the light is totally internally reflected by the outer surface 11a of the first waveguide 11 and the outer, total reflection surface 13a of the second waveguide 13.

The light incident on the first waveguide 11 is incident on the transmissive reflective layer 12. Some of the light is reflected by the transmissive reflective layer 12 to the outer surface 11a of the first waveguide 11 and the remaining light is transmitted through the transmissive reflective layer 12 and is incident on the second waveguide 13.

The light incident on the second waveguide 13 is reflected by the outer, total reflection surface 13a of the second waveguide 13 and travels to the transmissive reflective layer 12 again.

Some of the light that is reflected by the outer, total reflection surface 13a of the second waveguide 13 and incident on the transmissive reflective layer 12 is transmitted through the transmissive reflective layer 12 and into the first waveguide 11. The remaining light is reflected by the transmissive reflective layer 12 and travels again to the outer, total reflection surface 13a of the second waveguide 13.

The light incident on the outer surface 11a of the first waveguide 11, by being reflected by the transmissive reflective layer 12 or by being transmitted through the transmissive reflective layer 12, is totally internally reflected at the outer surface 11a and travels again to the transmissive reflective layer 12. Some of the light incident on the transmissive reflective layer 12 is transmitted through the transmissive reflective layer 12 and travels into the second waveguide 13, and the remaining light is reflected by the transmissive reflective layer 12 and travels again to the outer surface 11a of the first waveguide 11.

As described above, some of the light, which is reflected by the outer surface 11a of the first waveguide 11 and the outer, total reflection surface 13a of the second waveguide 13 and is incident on the transmissive reflective layer 12, is reflected by the transmissive reflective layer 12, and the remaining of the light is transmitted through the transmissive reflective layer 12. In this way, light incident on the transmissive reflective layer 12 is split into two paths. Since the light may be transmitted through the transmissive reflective layer 12 many times prior to being emitted through the out-coupler 19, the light initially incident on the in-coupler 18 is divided into several paths. The light having traveled on the plurality of paths is ultimately emitted toward the user's eye through the out-coupler 19 having the wide area, so that the dark portion of the image may be reduced.

In the above description, the transmissive reflective layer 12 is formed over the entire first waveguide 11; however, the waveguide 10 is not limited thereto. The transmissive reflective layer 12 may be formed to cover only a portion of the first waveguide 11.

Hereinafter, a waveguide in which a transmissive reflective layer is formed on only a portion of a first waveguide will be described with reference to FIG. 4.

Figure 4:
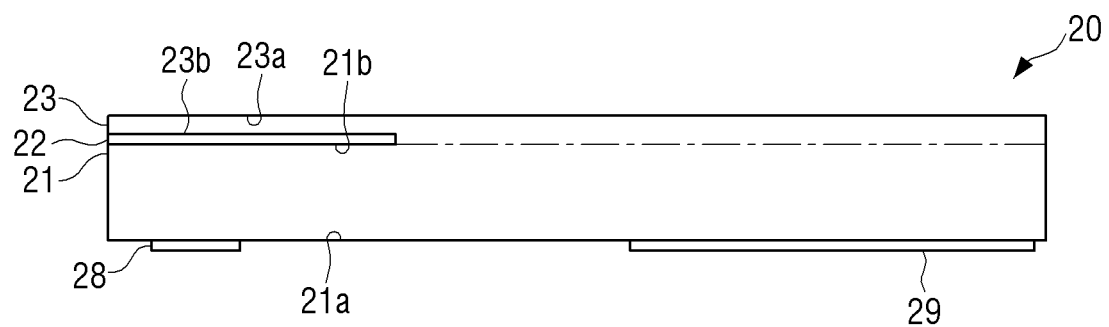
FIG. 4 is a cross-sectional view illustrating a waveguide according to another exemplary embodiment.

FIG. 4 is a cross-sectional view illustrating a waveguide according to another exemplary embodiment.

Referring to FIG. 4, a waveguide 20 according to an exemplary embodiment may include a first waveguide 21, a transmissive reflective layer 22, and a second waveguide 23.

The first waveguide 21 of the waveguide 20 according to the present exemplary embodiment is the same as or similar to the first waveguide 11 of the waveguide 10 according to the above-described exemplary embodiment, and thus a detailed description thereof is omitted.

The transmissive reflective layer 22 is formed on only a portion of an inner surface 21b of the first waveguide 21. In other words, the transmissive reflective layer 22 may be formed to cover only a portion of the top, inner surface 21b of the first waveguide 21, rather than the entire top surface 21b. Therefore, the area of the transmissive reflective layer 22 is smaller than the area of the inner surface 21b of the first waveguide 21. The area of the transmissive reflective layer 22 may be determined to have an appropriate size such that no dark portion is generated in the image formed by the light emitted through the out-coupler 19.

The transmissive reflective layer 22 is formed to reflect some of the light incident on the waveguide 20 and transmit the remaining light. In other words, the transmissive reflective layer 22 is a partially reflective-partially transmissive structure that transmits some light and reflects the remaining light.

The transmissive reflective layer 22 may be formed at a position overlapping with the position of the in coupler 28. For example, as illustrated in FIG. 4, the transmissive reflective layer 22 may be provided at a position directly above the in-coupler 28 so that the light transmitted through the in-coupler 18 is directly incident on the transmissive reflective layer 22.

The second waveguide 23 is formed on the top surface of the transmissive reflective layer 22 and on the exposed portion of the top, inner surface 21b of the first waveguide 21. In other words, a portion of the inner surface 21b of the first waveguide 21 and a portion of the inner surface 23b of the second waveguide 23 may directly contact each other without the transmissive reflective layer 22 therebetween.

The second waveguide 23 may include an outer surface 23a and an inner surface 23b. For example, the top, outer surface 23a of the second waveguide 23, which is in contact with air in FIG. 4, is a total reflection surface at which the light transmitted into the second waveguide 23 is totally internally reflected. A surface of the second waveguide 23 that is opposite the top, outer surface, that is, the inner, bottom surface 23b of the second waveguide 23 which is in contact with the transmissive reflective layer 22 and the first waveguide 21 in FIG. 4, is a surface through which the light may be transmitted.

Accordingly, a portion of the outer, total reflection surface 23a of the second waveguide 23 located above the transmissive reflective layer 22 totally internally reflects the light transmitted through the transmissive reflective layer 22 to the transmissive reflective layer 22, and a portion of the outer, total reflection surface 23a of the second waveguide 23 located above the first waveguide 21 totally internally reflects the incident light to the first waveguide 21.

The first waveguide 21, the transmissive reflective layer 22, and the second waveguide 23 of the waveguide 20 as illustrated in FIG. 4 may be formed of the same materials as described with respect to the first waveguide 11, the transmissive reflective layer 12, and the second waveguide 13 of the waveguide 10 as illustrated in FIG. 2.

The light that has been transmitted through the in-coupler 18 of the waveguide 20 as illustrated in FIG. 4 is refracted by the in-coupler 18 such that the light may be totally internally reflected by the outer, total reflection surface 21a of the first waveguide 21 and the outer, total reflection surface 23a of the second waveguide 23.

The light incident on the first waveguide 21 through the in-coupler 28 travels to the transmissive reflective layer 22. Some of the light is reflected by the transmissive reflective layer 22 to travel to the outer, total reflection surface 21a of the first waveguide 21, and the remaining light is transmitted through the transmissive reflective layer 22 to be incident on the second waveguide 23.

The light incident on the second waveguide 23 is reflected by the outer, total reflection surface 23a of the second waveguide 23 and travels again to the transmissive reflective layer 22.

Some of the light traveling to the transmissive reflective layer 22 from the outer, total reflection surface 23a of the second waveguide 23 is transmitted through the transmissive reflective layer 22 and travels to the first waveguide 21, and the remaining light is again reflected by the transmissive reflective layer 22 and travels to the outer, total reflection surface 23a of the second waveguide 23.

The light that travels to the outer, total reflection surface 21a of the first waveguide 21 by being reflected by the transmissive reflective layer 22 or by being transmitted through the transmissive reflective layer 22 is reflected by the outer, total reflection surface 21a and travels to the transmissive reflective layer 22 again. Some of the light incident on the transmissive reflective layer 22 is transmitted through the transmissive reflective layer 22 and travels to the second waveguide 23, and the remaining light is reflected by the transmissive reflective layer 22 and travels to the outer, total reflection surface 21a of the first waveguide 21.

However, in the portion of the waveguide 20 where there is no transmissive reflective layer 22, the light totally reflected by the outer, total reflection surface 21a of the first waveguide 21 is also totally reflected by the outer, total reflection surface 23a of the second waveguide 23 and travels again to the first waveguide 21. In other words, in the portion where there is no transmissive reflective layer 22, the light is totally reflected by the outer surface 21a of the first waveguide 21 and the total reflection surface 23a of the second waveguide 23 to be guided to the out-coupler 29, and emitted to the outside.

In the case of the waveguide 20 according to the present exemplary embodiment, the light may be transmitted through the transmissive reflective layer 22 partially provided between the first waveguide 21 and the second waveguide 23 several times before being output from the waveguide 20 through the out-coupler 29. In this way, light incident on the in-coupler 28 is split among several paths. Accordingly, the light traveling on the plurality of paths is emitted toward the user's eye through the out-coupler 29, so that the dark portion of the image may be reduced.

In FIG. 4, the transmissive reflective layer 22 is disposed above the in-coupler 18 of the first waveguide 21; however, the position of the transmissive reflective layer 22 is not limited thereto. The transmissive reflective layer 22 may be provided at any position on the inner surface 21b of the first waveguide 21 as long as it can divide the light incident through the in-coupler 28 into a plurality of paths.

Figure 5:
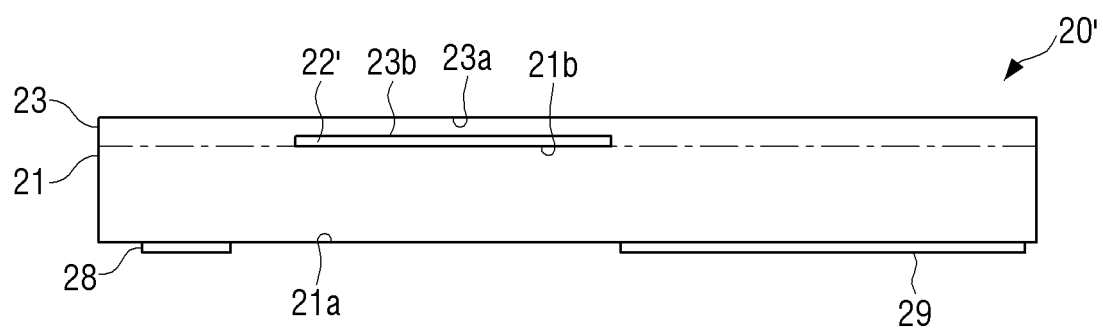
FIG. 5 is a cross-sectional view illustrating a modification of the waveguide of FIG. 4.

FIG. 5 is a cross-sectional view illustrating a modification of the waveguide of FIG. 4.

Referring to FIG. 5, a waveguide 20' according to an exemplary embodiment may include a first waveguide 21, a second waveguide 23, and a transmissive reflective layer 22' in the same manner as the waveguide 20 of FIG. 4.

The waveguide 20' of FIG. 5 is formed such that the area of the transmissive reflective layer 22' is smaller than the area of the top surface of the first waveguide 21, like the waveguide 20 shown in FIG. 4.

The waveguide 20' shown in FIG. 5 is different from the waveguide 20 illustrated in FIG. 4 in that the transmissive reflective layer 22' is not disposed directly above the in-coupler 28 but is spaced a predetermined distance in the longitudinal direction of the waveguide 20' from the in-coupler 28. Therefore, the light introduced into the in-coupler 28 may be reflected by the total reflection surface 23a of the second waveguide 23, and then enter the transmissive reflective layer 22'.

The waveguide 20' illustrated in FIG. 5 is the same as or similar to the waveguide 20 illustrated in FIG. 4 except for the position of the transmissive reflective layer 22'; therefore, a detailed description thereof is omitted.

In the above description, a single transmissive reflective layer 22 is provided between the first waveguide 21 and the second waveguide 23. However, the number of transmissive reflective layers 22 is not limited thereto. For example, two or more transmissive reflective layers 22 may be provided between the first waveguide and the second waveguide. In such an exemplary embodiment, a third waveguide may be provided between two adjacent transmissive reflective layers.

Hereinafter, a waveguide having two transmissive reflective layers will be described with reference to FIG. 6.

Figure 6:
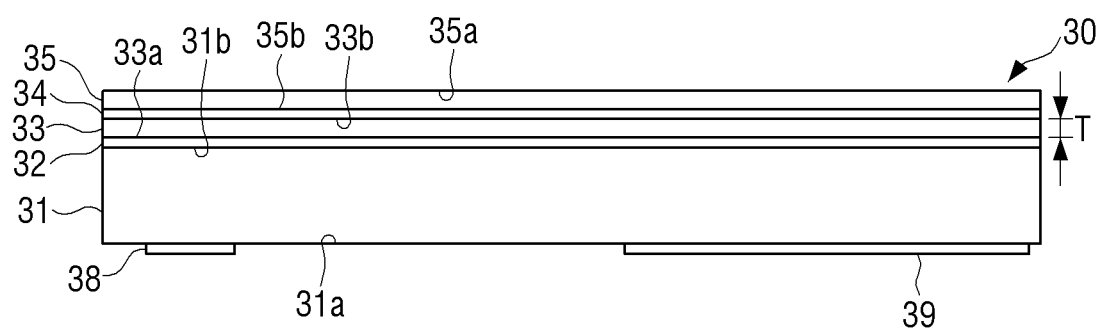
FIG. 6 is a cross-sectional view illustrating a waveguide according to another exemplary embodiment.

FIG. 6 is a cross-sectional view illustrating a waveguide according to another exemplary embodiment.

Referring to FIG. 6, a waveguide 30 according to an exemplary embodiment may include a first waveguide 31, a first transmissive reflective layer 32, a third waveguide 33, a second transmissive reflective layer 34, and a second waveguide 35.

The first waveguide 31 and the first transmissive reflective layer 32 of the waveguide 30 according to the present exemplary embodiment are the same as or similar to the first waveguide 11 and transmissive reflective layer 12 of the waveguide 10 according to the exemplary embodiment as illustrated in FIG. 2; therefore, detailed descriptions thereof are omitted.

The third waveguide 33 is provided on the first transmissive reflective layer 32 and is formed so that the light transmitted through the first transmissive reflective layer 32 can be transmitted through the third waveguide 33. The third waveguide 33 may include two surfaces 33a and 33b. For example, the first 33a in contact with the first transmissive reflective layer 32, that is, the bottom surface of the third waveguide 33 in FIG. 6 and the second 33b in contact with the second transmissive reflective layer 34, that is, the top surface of the third waveguide 33 in FIG. 6 form transmission surfaces through which the light can be transmitted. The third waveguide 33 is provided to cover the entire top surface of the first transmissive reflective layer 32.

The third waveguide 33 is formed of a transparent material. For example, the third waveguide 33 may be formed of the same material as the first waveguide 31. Alternatively, the third waveguide 33 may be formed of a different material which is transparent and has the same or similar refractive index as that of the first waveguide 31.

The second transmissive reflective layer 34 is provided on the third waveguide 33 and is formed to reflect some of incident light transmitted through the first transmissive reflective layer 32 and to transmit the remaining light. In other words, the second transmissive reflective layer 34 is a partially reflective-partially transmissive structure that transmits some light and reflects the remaining light, like the first transmissive reflective layer 32. The second transmissive reflective layer 34 may be formed to cover the entire top surface of the third waveguide 33. In other words, the second transmissive reflective layer 34 may be formed in the same shape and size as the third waveguide 33. The second transmissive reflective layer 34 is spaced a predetermined distance from the first transmissive reflective layer 32 by the thickness T of the third waveguide 33.

The second transmissive reflective layer 34 may be formed of a metal coating formed by coating a metal such as gold, silver, or aluminum, a multilayer dielectric coating, a diffractive structure, or the like on the top surface of the third waveguide 33. In other words, the second transmissive reflective layer 34 may be formed of the same material as the first transmissive reflective layer 32.

The second waveguide 35 is provided on the second transmissive reflective layer 34 and is formed to totally reflect the light transmitted through the second transmissive reflective layer 34 back to the second transmissive reflective layer 34. The second waveguide 35 may include an outer, total reflection surface 35a and an inner surface 35b. For example, the outer surface 35a of the second waveguide 35 which is in contact with air, that is, the top surface 35a of the second waveguide 35 in FIG. 6 forms a total reflection surface at which the light transmitted through the second transmissive reflective layer 34 is totally internally reflected. Opposite to the outer, total reflection surface 35a is an inner surface 35b of the second waveguide 35, that is, the bottom surface 35b of the second waveguide 35 which is in contact with the second transmissive reflective layer 34 in FIG. 6. This inner surface 35b is a surface at which the light transmitted through the second transmissive reflective layer 34 may be transmitted.

The second waveguide 35 may be formed of a transparent material in which the incident light can be guided. Accordingly, the second waveguide 35 may be formed of the same material as the first waveguide 31. Alternatively, the second waveguide 35 may be formed of a different material that is transparent and has the same or similar refractive index as that of the first waveguide 31.

The operation of the waveguide 30 according to an exemplary embodiment having the above-described structure will be described with reference to FIG. 7.

Figure 7:
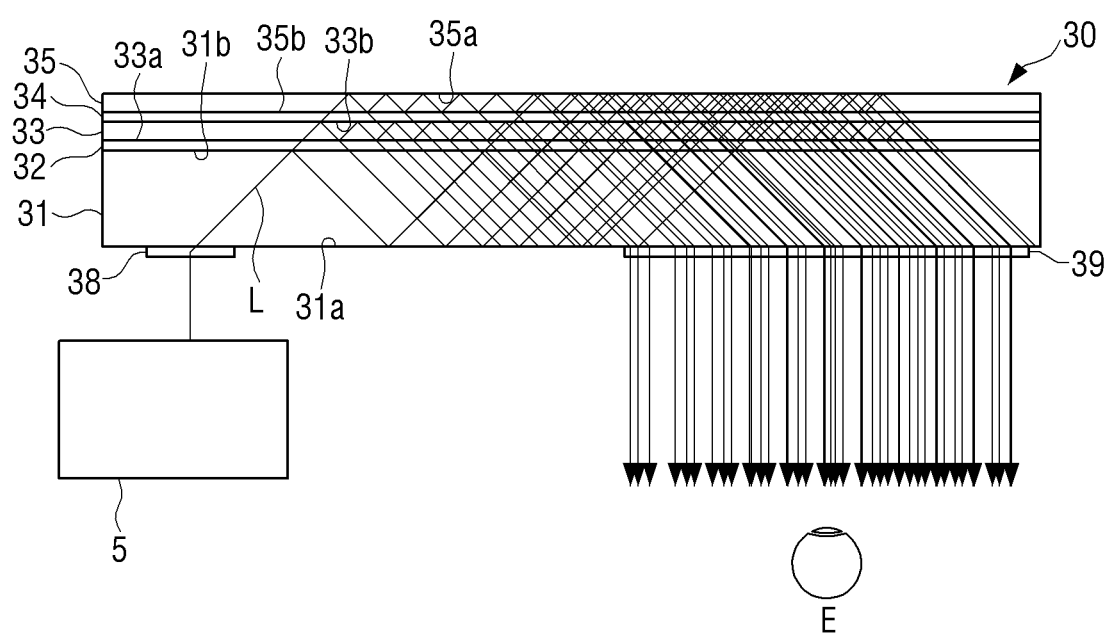
FIG. 7 is a view illustrating light guided by the waveguide of FIG. 6.

FIG. 7 is a view schematically illustrating light guided by the waveguide of FIG. 6.

Referring to FIG. 7, light L emitted from the projecting part 5 is incident on the in-coupler 38 of the waveguide 30.

The light L transmitted through the in-coupler 38 is refracted by the in-coupler 38 so that the light is totally internally reflected by the outer, total reflection surface 31a of the first waveguide 31 and the outer, total reflection surface 35a of the second waveguide 35.

The light incident on the first waveguide 31 travels to the first transmissive reflective layer 32. Some of the light L is reflected by the first transmissive reflective layer 32 and is incident on the outer, total reflection surface 31a of the first waveguide 31, and the remaining light is transmitted through the first transmissive reflective layer 32 and is incident into the third waveguide 33.

The light incident into the third waveguide 33 is transmitted through the third waveguide 33 and is incident on the second transmissive reflective layer 34. Some of the light is reflected by the second transmissive reflective layer 34 and travels to the first transmissive reflective layer 32, and the remaining light is transmitted through the second transmissive reflective layer 34 and is incident on the second waveguide 35.

Some of the light reflected by the second transmissive reflective layer 34 and incident on the first transmissive reflective layer 32 is reflected by the first transmissive reflective layer 32, is transmitted through the third waveguide 33, and travels to the second transmissive reflective layer 34. The remaining light is transmitted through the first transmissive reflective layer 32 and is incident on the first waveguide 31. The light incident on the first waveguide 31 is totally reflected by the total reflection surface 31a and travels again to the first transmissive reflective layer 32.

The light incident on the first transmissive reflective layer 32 is output through the out-coupler 39 by repeating the same process as described above in which some of the light is reflected and the remaining light is transmitted.

The light incident on the second waveguide 35 by being transmitted through the second transmissive reflective layer 34 or by being reflected by the second transmissive reflective layer 34 is reflected by the outer, total reflection surface 35a of the second waveguide 35 and then travels again to the second transmissive reflective layer 34.

Some of the light travelling to the second transmissive reflective layer 34 by the total reflection surface 35a of the second waveguide 35 is transmitted through the second transmissive reflective layer 34 and travels to the first transmissive reflective layer 32, and the remaining light is again reflected by the second transmissive reflective layer 34 and travels to the outer, total reflection surface 35a of the second waveguide 35.

The light incident on the total reflection surface 31a of the first waveguide 31 by being reflected by the first transmissive reflective layer 32 or by being transmitted through the first transmissive reflective layer 32 is reflected by the total reflection surface 31a, and travels again to the first transmissive reflective layer 32. Some of the light traveling to the first transmissive reflective layer 32 is transmitted through the first transmissive reflective layer 32 and travels to the second transmissive reflective layer 34, and the remaining light is reflected by the first transmissive reflective layer 32 and travels to the total reflection surface 31a of the first waveguide 31.

When the light reflected by the first transmissive reflective layer 32 is incident on the out-coupler 39, the light is emitted to the outside of the waveguide 30 through the out-coupler 39.

As described above, when the light is reflected by the outer total reflection surface 31a of the first waveguide 31 and the outer total reflection surface 35a of the second waveguide 35 and travels to the first and second transmissive reflective layers 32 and 34, some of the light is transmitted through the first and second transmissive reflective layers 32 and 34, and the remaining light is reflected by the first and second transmissive reflective layers 32 and 34, so that the light is split into two paths by each of the first and second transmissive reflective layers 32 and 34. Since the light is transmitted through the first and second transmissive reflective layers 32 and 34 many times before being emitted through the out-coupler 39, the light incident on the in-coupler 38 is divided into a plurality of paths as illustrated in FIG. 7. The dark portion of the image may be reduced because the large number of paths along which the light is emitted toward the eye through the out-coupler 39 have a large area.

When two or more transmissive reflective layers 32 and 34 are formed between the first waveguide 31 and the second waveguide 35 and at least one third waveguide 33 is provided between the two or more transmissive reflective layers 32 and 34 as described above, the light incident on the in-coupler 38 is divided among a larger number of paths than when the light is reflected or transmitted by only one transmissive reflective layer 12 (see FIGS. 2 and 3), so that the dark portion may be more effectively reduced.

In the above description, the first and second transmissive reflective layers 32 and 34 are formed to cover the entire transmission surface 31b of the first waveguide 31; however, the waveguide 30 is not limited thereto. The first and second transmissive reflective layers 32 and 34 may be formed to cover only a portion of the first waveguide 31.

Hereinafter, a waveguide formed so that first and second transmissive reflective layers cover only a portion of a first waveguide will be described with reference to FIG. 8.

Figure 8:
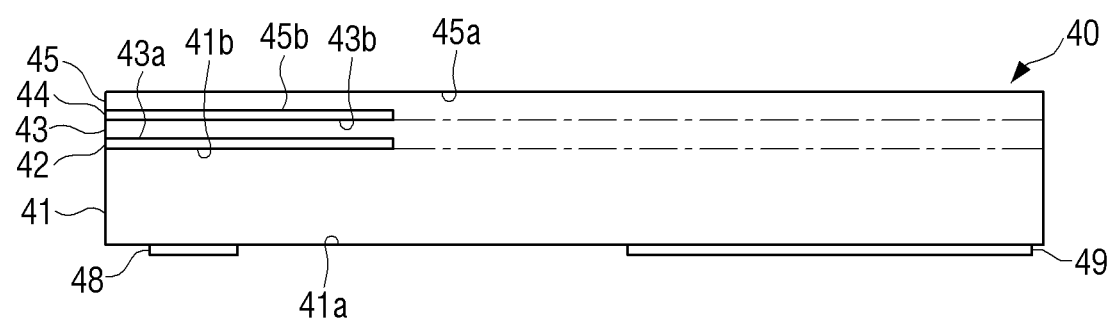
FIG. 8 is a cross-sectional view illustrating a waveguide according to another exemplary embodiment.

FIG. 8 is a cross-sectional view illustrating a waveguide according to another exemplary embodiment.

Referring to FIG. 8, a waveguide 40 according to an exemplary embodiment may include a first waveguide 41, a first transmissive reflective layer 42, a third waveguide 43, a second transmissive reflective layer 44, and a second waveguide 45.

The first waveguide 41 of the waveguide 40 according to the present exemplary embodiment is the same as or similar to the first waveguide 31 of the waveguide 30 according to the exemplary embodiment illustrated in FIGS. 6 and 7; therefore, a detailed description thereof is omitted.

The first transmissive reflective layer 42 is formed on only a portion of a transmission surface 41b of the first waveguide 41. In other words, the first transmissive reflective layer 42 may be formed to cover only a portion of the top surface 41b of the first waveguide 41, rather than the entire top surface 41b. Therefore, the area of the first transmissive reflective layer 42 is smaller than the area of the transmission surface 41b of the first waveguide 41. The area of the first transmissive reflective layer 42 may be determined to have a size such that no dark portion is generated in the image formed by the light emitted through the out-coupler 49.

The first transmissive reflective layer 42 is formed to reflect some of the light incident thereon and to transmit the remaining light. In other words, the first transmissive reflective layer 42 is a partially reflective-partially transmissive structure that transmits some light and reflects the remaining light.

The first transmissive reflective layer 42 may be formed at a position corresponding to, and overlapping with, the position of an in-coupler 48. For example, as illustrated in FIG. 8, the first transmissive reflective layer 42 may be provided at a position directly above the in-coupler 48 so that the light passing through the in-coupler 48 can be directly incident on the transmissive reflective layer 42.

The third waveguide 43 is provided on the top surface of the first transmissive reflective layer 42 and is formed so that the light transmitted through the first transmissive reflective layer 42 can be transmitted through the third waveguide 43. The third waveguide 43 may include two opposite transmission surfaces 43a and 43b. For example, the surface 43a in contact with the first transmissive reflective layer 42, that is, the bottom surface of the third waveguide 43 in FIG. 8 and the surface 43b in contact with the second transmissive reflective layer 44, that is, the top surface of the third waveguide 43 in FIG. 8 form the transmission surfaces through which the light can be transmitted. The third waveguide 43 is provided to cover the entire top surface of the first transmissive reflective layer 42. Alternatively, the third waveguide 43 may be formed to cover both the first transmissive reflective layer 42 and the top surface of the first waveguide 41 in which the first transmissive reflective layer 42 is not formed.

The second transmissive reflective layer 44 is provided on the top surface of the third waveguide 43 and is formed to reflect some of the light transmitted through the first transmissive reflective layer 42 and to transmit the remaining light. In other words, the second transmissive reflective layer 44 is a partially reflective-partially transmissive structure that transmits some light and reflects the remaining light, like the first transmissive reflective layer 42. The second transmissive reflective layer 44 may be formed to cover the entire top surface of the first transmissive reflective layer 42. In other words, the second transmissive reflective layer 44 may be formed in the same shape and size as the first transmissive reflective layer 42. The second transmissive reflective layer 44 is spaced a predetermined distance from the first transmissive reflective layer 42 by the thickness of the third waveguide 43.

The second waveguide 45 is formed on the top surface of the second transmissive reflective layer 44. A portion of the second waveguide 45 is located on the top surface of the second transmissive reflective layer 44, and the remaining portion of the second waveguide 45 is located on the top surface of the first waveguide 41. In other words, the portion of the first waveguide 41 and the portion of the second waveguide 45 may directly contact each other without the first and second transmissive reflective layers 42 and 44 therebetween. As another example, when the third waveguide 43 formed between the first transmissive reflective layer 42 and the second transmissive reflective layer 44 extends to the top surface of the first waveguide 41, the third waveguide 43 may be formed between the first waveguide 41 and the second waveguide 45.

The second waveguide 45 may include an outer, total reflection surface 45a and an inner surface 45b. For example, an outer surface of the second waveguide 45 which is in contact with air, that is, the top surface of the second waveguide 45 in FIG. 8 forms an outer, total reflection surface at which the light entered the second waveguide 45 is totally reflected. Opposite the outer, total reflection surface 45a is the bottom surface 45b of the second waveguide 45 which is in contact with the second transmissive reflective layer 44 and the first waveguide 41 (or the third waveguide 43). The bottom, inner surface 45a of the second waveguide 45 is a surface at which the light may be transmitted.

Therefore, the portion of the total reflection surface 45a of the second waveguide 45 positioned above the second transmissive reflective layer 44 totally reflects the light transmitted through the second transmissive reflective layer 44 to the second transmissive reflective layer 44, and the portion of the total reflection surface 45a of the second waveguide 45 positioned above the first waveguide 41 totally reflects the incident light to the first waveguide 41.

The first waveguide 41, the first transmissive reflective layer 42, the third waveguide 43, the second transmissive reflective layer 44, and the second waveguide 45 of the waveguide 40 illustrated in FIG. 8 may be formed of the same material as the first waveguide 31, the first transmissive reflective layer 32, the third waveguide 33, the second transmissive reflective layer 34, and the second waveguide 35 of the waveguide 30 illustrated in FIG. 6.

The light incident on the waveguide 40 through the in-coupler 48 of the waveguide 40 illustrated in FIG. 8 is refracted by the in-coupler 48 so that the light is totally reflected by the total reflection surface 41a of the first waveguide 41 and the total reflection surface 45a of the second waveguide 45.

The light incident on the first waveguide 41 through the in-coupler 48 travels to the first transmissive reflective layer 42. Some of the light is reflected by the first transmissive reflective layer 42 and travels to the total reflection surface 41a of the first waveguide 41, and the remaining light is transmitted through the first transmissive reflective layer 42 and is incident on the third waveguide 43.

The light that has been transmitted through the third waveguide 43 is incident on the second transmissive reflective layer 44. Some of the light incident on the second transmissive reflective layer 44 is reflected by the second transmissive reflective layer 44 and travels to the first transmissive reflective layer 42, and the remaining light is transmitted through the second transmissive reflective layer 44 and is incident on the second waveguide 45.

The light incident on the second waveguide 45 is totally reflected by the total reflection surface 45a of the second waveguide 45 and travels again to the second transmissive reflective layer 44.

Some of the light traveling to the second transmissive reflective layer 44 by the total reflection surface 45a of the second waveguide 45 is transmitted through the second transmissive reflective layer 44 and travels to the first transmissive reflective layer 42. The remaining light is again reflected by the second transmissive reflective layer 44 and travels to the total reflection surface 45a of the second waveguide 45.

Some of the light transmitted through the second transmissive reflective layer 44 and incident on the first transmissive reflective layer 42 is again reflected by the first transmissive reflective layer 42 and travels to the second transmissive reflective layer 44, and the remaining light is transmitted through the first transmissive reflective layer 42, enters the first waveguide 41, and travels to the total reflection surface 41a.

The light incident on the total reflection surface 41a of the first waveguide 41 by being reflected by the first transmissive reflective layer 42 or by being transmitted through the first transmissive reflective layer 42 is totally reflected by the total reflection surface 41a of the first waveguide 41 and again travels to the first transmissive reflective layer 42. Some of the light traveling to the first transmissive reflective layer 42 is transmitted through the first transmissive reflective layer 42 and travels to the second transmissive reflective layer 44, and the remaining light is reflected by the first transmissive reflective layer 42 and travels to the total reflection surface 41a of the first waveguide 41.

However, in the portion where the first and second transmissive reflective layers 42 and 44 are not present, the light reflected by the total reflection surface 41a of the first waveguide 41 is totally reflected by the total reflection surface 45a of the second waveguide 45 and travels to the first waveguide 41. In other words, in the portion where the first and second transmissive reflective layers 42 and 44 are not present, the light is totally reflected by the total reflection surface 41a of the first waveguide 41 and the total reflection surface 45a of the second waveguide 45 to be transmitted to the out-coupler 49, and is output to the outside.

In the case of the waveguide 40 according to the present exemplary embodiment, since the light incident on the waveguide 40 through the in-coupler 48 may be transmitted multiple times through the first and second transmissive reflective layers 42 and 44 before being emitted through the out-coupler 49, the light incident on the in-coupler 48 is divided into a plurality of paths. Therefore, the dark portion of the image is reduced because of the large number of paths along which the light is emitted toward the eye through the out-coupler 49.

In FIG. 8, the first and second transmissive reflective layers 42 and 44 are disposed above the in-coupler 48 of the first waveguide 41. However, the positions of the first and second transmissive reflective layers 42 and 44 are not limited thereto. The first and second transmissive reflective layers 42 and 44 may be provided at any positions on the inner surface 41b of the first waveguide 41 so long as they can divide the light incident through the in-coupler 48 into a plurality of paths.

For example, although not illustrated, the first transmissive reflective layer 42 is disposed directly above the in-coupler 48 as illustrated in FIG. 8, but the second transmissive reflective layer 44 may be spaced apart a predetermined distance from the first transmissive reflective layer 42 in the longitudinal direction of the waveguide 40. As another example, the second transmissive reflective layer 44 may be positioned directly above the in-coupler 48 and the first transmissive reflective layer 42 may be spaced apart a predetermined distance from the second transmissive reflective layer 44 in the longitudinal direction of the waveguide 40.

In the above description, the first and second transmissive reflective layers 42 and 44 provided between the first waveguide 41 and the second waveguide 45 have the same size. However, the first and second transmissive reflective layers 42 and 44 may have different sizes.

Figure 9:
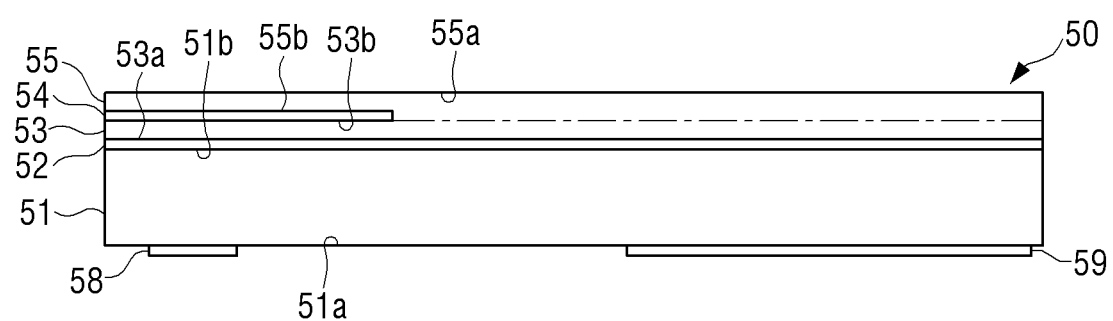
FIG. 9 is a cross-sectional view illustrating a waveguide according to another exemplary embodiment.

A waveguide in which the sizes of the first transmissive reflective layer and the second transmissive reflective layer are different is illustrated in FIG. 9.

Referring to FIG. 9, a waveguide 50 according to an exemplary embodiment may include a first waveguide 51, a first transmissive reflective layer 52, a third waveguide 53, a second transmissive reflective layer 54, and a second waveguide 55.

The size of the first transmissive reflective layer 52 of the waveguide 50 illustrated in FIG. 9 is different from the size of the first transmissive reflective layer 42 of the waveguide 40 illustrated in FIG. 8. The first waveguide 51, the third waveguide 53, the second transmissive reflective layer 54, and the second waveguide 55 are the same as or similar to the first waveguide 41, the third waveguide 43, the second transmissive reflective layer 44, and the second waveguide 45 of the waveguide 40 illustrated in FIG. 8. Therefore, descriptions thereof are omitted.

The first transmissive reflective layer 52 is formed on the top, inner surface 51b of the first waveguide 51, and entirely covers the transmission surface 51b of the first waveguide 51.

The third waveguide 53 is formed to cover the entire first transmissive reflective layer 52.

The second transmissive reflective layer 54 is formed to cover a portion of the third waveguide 53, that is, a portion of the first transmissive reflective layer 52 on the top surface of the third waveguide 53. Therefore, the area of the second transmissive reflective layer 54 is smaller than the area of the first transmissive reflective layer 52.

Accordingly, as illustrated in FIG. 9, the waveguide 50 according to an exemplary embodiment may be formed such that the first transmissive reflective layer 52 and the second transmissive reflective layer 54 provided between the first waveguide 51 and the second waveguide 55 have different sizes.

The sizes of the first and second transmissive reflective layers 32 and 34 may be appropriately determined so that no dark portions are generated in the image formed by the light emitted through the out-coupler 59.

As another example, the sizes of the first transmissive reflective layer 52 and the second transmissive reflective layer 54 may be different from those illustrated in FIG. 9. In other words, the second transmissive reflective layer 54 may be formed to have a size that covers the entire first waveguide 51 and the first transmissive reflective layer 52 may be smaller than the second transmissive reflective layer 54 to cover only a portion of the first waveguide 51.

In the above description, the light incident on the waveguide 10, 20, 30, 40, and 50 is refracted at an angle permitting total reflection through the in-coupler 18, 28, 38, 48, and 58 provided in the first waveguide 11, 21, 31, 41, and 51, and is incident on the first waveguide 11, 21, 31, 41, and 51; however, exemplary embodiments are not limited thereto. If the light incident on the waveguide can be refracted to cause total reflection, the in-coupler may be formed as a prism.

Hereinafter, the case where the light emitted from the projecting part is incident on the waveguide through a prism will be described with reference to FIGS. 10 and 11.

Figure 10:
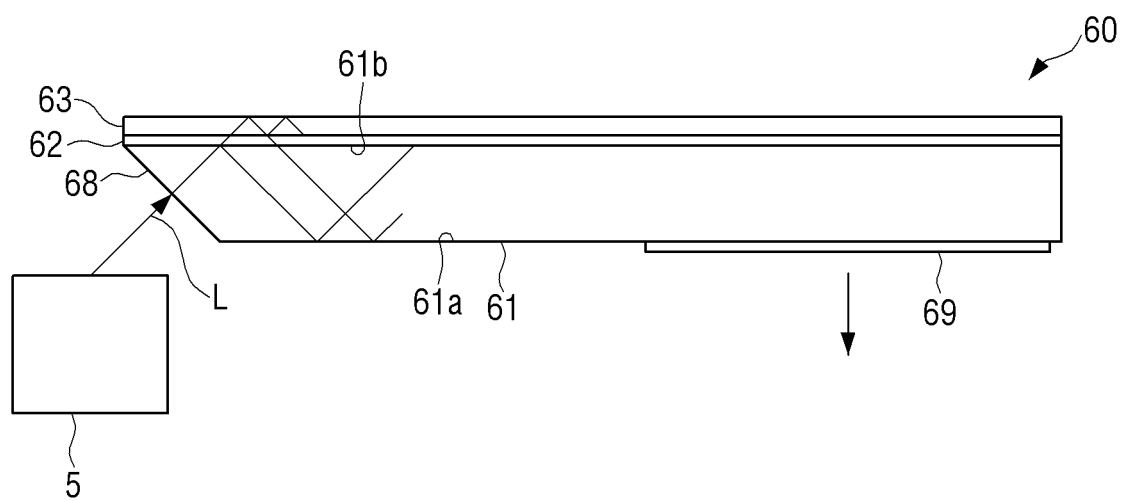
FIG. 10 is a cross-sectional view illustrating a waveguide according to another exemplary embodiment.

FIG. 10 is a cross-sectional view illustrating a waveguide according to another exemplary embodiment.

Referring to FIG. 10, a waveguide 60 according to an exemplary embodiment may include a first waveguide 61, a transmissive reflective layer 62, and a second waveguide 63.

The first waveguide 61 is formed such that the incident light is guided therewithin and emitted through an out-coupler 69. The first waveguide 61 may include an outer, total reflection surface 61a and an inner surface 61b. For example, the outer surface 61a of the first waveguide 61 which is in contact with air, that is the bottom surface of the first waveguide 61 in FIG. 10, forms a total reflection surface on which the incident light is totally reflected. Opposite the outer surface 61a is an inner surface 61b of the first waveguide 61, that is, the top surface 61b of the first waveguide 61 in FIG. 2 which forms a surface at which the incident light may be transmitted.

At one end of the first waveguide 61, an inclined surface 68 on which the light emitted from the projecting part 5 is incident is formed. The inclined surface 68 transmits the light so that the light can be totally reflected by the outer, total reflection surface 61a of the first waveguide 61. As shown in FIG. 10, the inclined surface 68 may transmit light therethrough without refraction. Alternately, the inclined surface 68 of the first waveguide 61 may function as a prism that refracts the incident light at a predetermined angle.

The out-coupler 69 is provided on a surface of the first waveguide 61, that is, on the outer surface 61a, as shown in FIG. 10. The out-coupler 69 may transmit the light so that the light guided within the waveguide 40 is emitted toward the user's eye. The out-coupler 69 may be formed in any of a variety of ways as long as the out-coupler 69 can direct the emitted light toward the user's eye. For example, the out-coupler 69 may be implemented as a diffraction optical element (DOE), a hologram optical element (HOE), a micro pattern, a mirror array, or the like.

The diameter of the out-coupler 69 may be formed to have a size corresponding to the user's eye.

The transmissive reflective layer 62 and the second waveguide 63 are the same as the transmissive reflective layer 12 and the second waveguide 13 of the waveguide 10 of FIG. 2 described above; therefore, detailed descriptions thereof are omitted.

Therefore, since the light incident on the inclined surface 68 of the waveguide 60 of FIG. 10 is divided among a plurality of paths by the transmissive reflective layer 62 while passing through the waveguide 60, dark portions generated in an image formed by the light emitted through the out-coupler 69 may be reduced.

Figure 11:
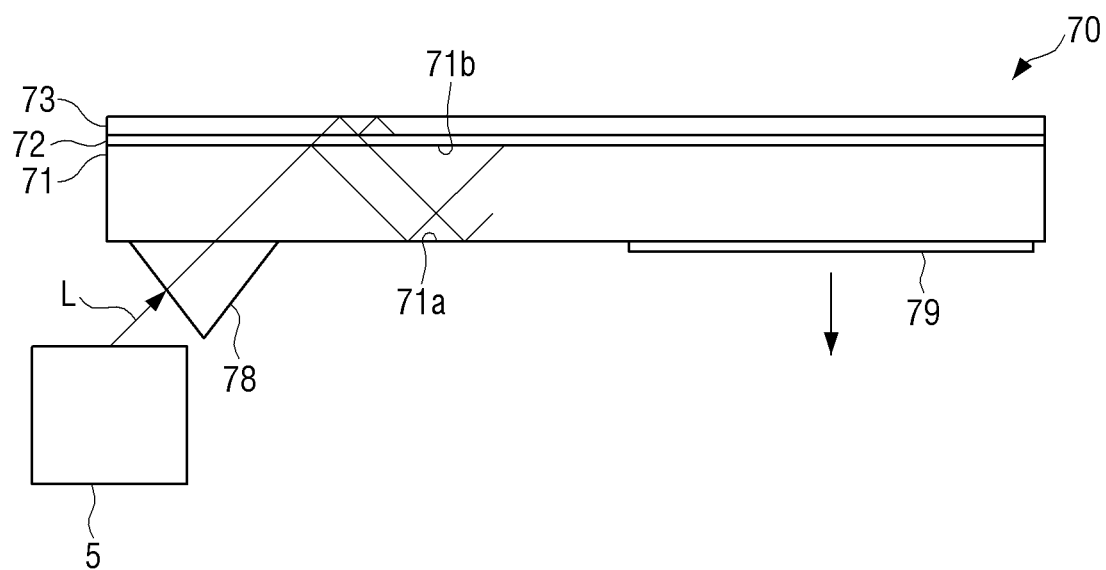
FIG. 11 is a cross-sectional view illustrating a waveguide according to another exemplary embodiment.

FIG. 11 is a cross-sectional view illustrating a waveguide according to another exemplary embodiment.

Referring to FIG. 11, a waveguide 70 according to an exemplary embodiment may include a first waveguide 71, a transmissive reflective layer 72, and a second waveguide 73.

The first waveguide 71 is formed such that the incident light is guided therewithin and emitted through an out-coupler 79. The first waveguide 71 may include an outer, total reflection surface 71a and an inner surface 71b. For example, an outer surface 71a of the first waveguide 71 which is in contact with air, that is the bottom surface of the first waveguide 71 in FIG. 11, forms a total reflection surface on which the incident light is totally reflected. Opposite the outer surface 71a is an inner surface 71b of the first waveguide 71, that is, the top surface 71b in FIG. 11, at which the incident light may be transmitted.

A prism 78 on which the light emitted from the projecting part 5 is incident is provided on the total reflection surface 71a of the first waveguide 71. The prism 78 protrudes downward from the bottom surface 71a of the first waveguide 71. The prism 78 transmits the incident light so that the incident light is totally reflected by the outer, total reflection surface 71a. As shown in FIG. 11, the prism 78 may transmit light therethrough without refraction. Alternately, the prism 78 may refract the incident light at a predetermined angle.

An out-coupler 79 is provided on the total reflection surface 71a of the first waveguide 71. The out-coupler 79 is the same as the out-coupler 69 of the waveguide 60 of FIG. 10 described above, and thus a detailed description thereof is omitted.

Further, the transmissive reflective layer 72 and the second waveguide 73 are the same as the transmissive reflective layer 12 and the second waveguide 13 of the waveguide 10 of FIG. 2 described above; therefore, detailed description thereof are omitted.

Therefore, since the light incident on the prism 78 of the waveguide 70 illustrated in FIG. 11 is divided among a plurality of paths by the transmissive reflective layer 72 while passing through the waveguide 70, dark portions generated in an image formed by the light emitted through the out-coupler 79 may be reduced.

In the above description, the in-couplers 18, 28, 38, 48, 58, 68, and 78 and the out-couplers 19, 29, 39, 49, 59, 69, and 79 are provided on the bottom surfaces of the respective waveguides 10, 20, 30, 40, 50, 60, and 70. However, the provision of the in-couplers 18, 28, 38, 48, 58, 68, and 78 and the out-couplers 19, 29, 39, 49, 59, 69, and 79 is not limited thereto. As another example, the in-couplers 18, 28, 38, 48, 58, 68, and 78 and the out-couplers 19, 29, 39, 49, 59, 69, and 79 may be provided on different surfaces rather than on the same surface.

A case where an in-coupler and an out-coupler are provided on different surfaces of the waveguide will be described with reference to FIG. 12.

Figure 12:
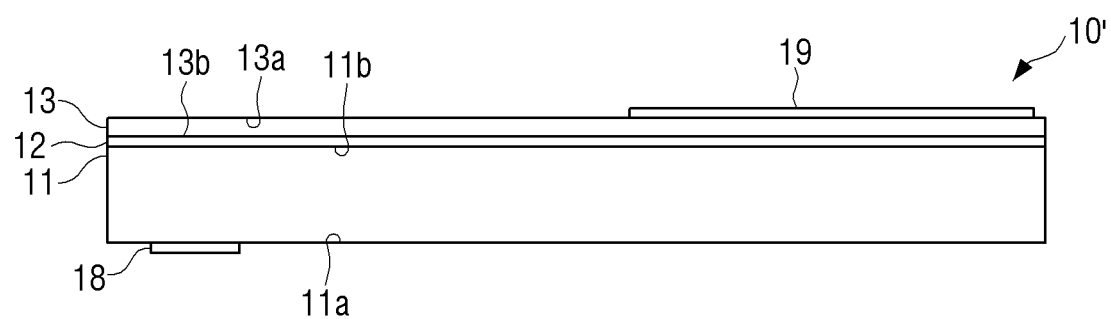
FIG. 12 is a cross-sectional view illustrating a waveguide according to another exemplary embodiment.

Referring to FIG. 12, the waveguide 10' according to an exemplary embodiment may include a first waveguide 11, a transmissive reflective layer 12, a second waveguide 13, an in-coupler 18, and an out-coupler 19.

In the case of the present exemplary embodiment, the first waveguide 11, the transmissive reflective layer 12, and the second waveguide 13 are the same as those of the waveguide 10 according to an exemplary embodiment as illustrated in FIG. 2. Therefore, detailed descriptions thereof are omitted.

The in-coupler 18 and the out-coupler 19 are configured in the same manner as the in-coupler 18 and the out-coupler 19 of the waveguide 10 illustrated in FIG. 2, but have different arrangements.

In other words, the in-coupler 18 is provided on the bottom surface of the waveguide 10', that is, the bottom surface 11a of the first waveguide 11, and the out-coupler 19 is provided on the top surface of the waveguide 10', that is, the top surface 13a of the second waveguide 13. Therefore, the light incident on the in-coupler 18 provided on the bottom surface of the waveguide 10' is emitted to the upper side of the waveguide 10' through the out-coupler 19 provided on the top surface of the waveguide 10'.

Although not illustrated, in the other exemplary embodiments as described above, the in-couplers 28, 38, 48, 58, 68, and 78 and the out-couplers 29, 39, 49, 59, 69, and 79 may be formed on different surfaces of the respective waveguides 20, 30, 40, 50, 60, and 70.

Hereinafter, a method of manufacturing a waveguide according to an exemplary embodiment will be described with reference to FIGS. 13A to 13D.

FIGS. 13A to 13D are views for explaining a method of manufacturing a waveguide according to an exemplary embodiment.

Figure 13A:
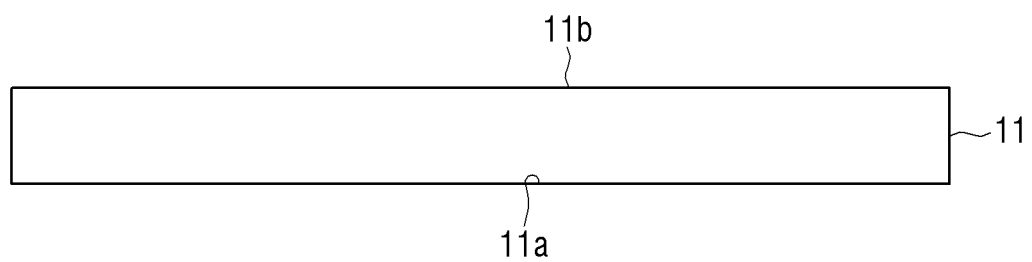
FIGS. 13A to 13D are views for explaining a method of manufacturing a waveguide according to an exemplary embodiment.

First, as illustrated in FIG. 13A, a first waveguide 11 is formed of a transparent material having a refractive index lager than that of air.

Figure 13B:
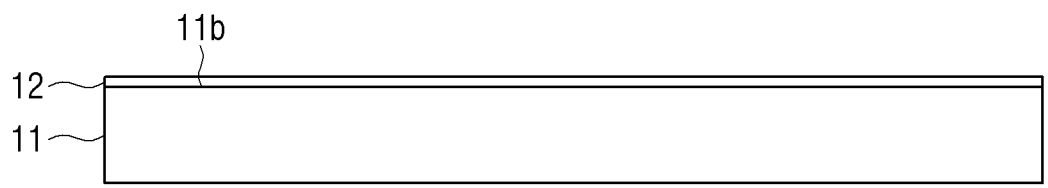

Next, as illustrated in FIG. 13B, a transmissive reflective layer 12 is formed on the top surface 11b of the first waveguide 11. The transmissive reflective layer 12 may be formed by any of various methods such as coating, vapor deposition, film attachment, or the like.

For example, the transmissive reflective layer 12 may be formed by coating a metal such as gold, silver, aluminum, etc., a dielectric, or the like on the top surface 11b of the first waveguide 11. Alternatively, the transmissive reflective layer 12 may be formed by attaching an optical film having a semi-transmissive and semi-reflective function to the top surface 11b of the first waveguide 11. Alternatively, the transmissive reflective layer 62 may be formed by depositing a diffractive structure capable of partial transmission-partial reflection on the top surface 11b of the first waveguide 11.

Figure 13C:
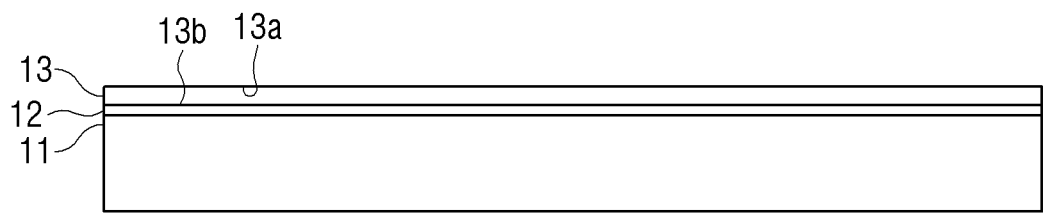

Next, as illustrated in FIG. 13C, a second waveguide 13 is formed on the top surface of the transmissive reflective layer 12. At this time, the second waveguide 13 is formed of a transparent material having a refractive index larger than that of air.

Figure 13D:
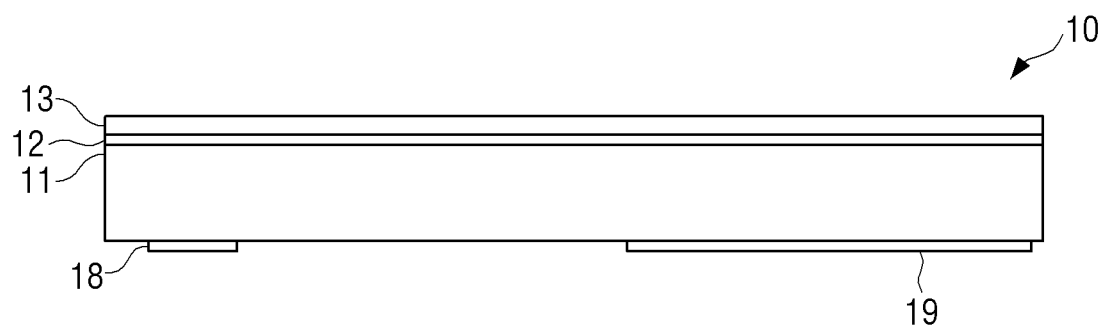

Finally, as illustrated in FIG. 13D, the manufacturing of the waveguide 10 is completed by forming an in-coupler 18 and an out-coupler 19 on the bottom surface of the first waveguide 11.

The waveguide 10 according to an exemplary embodiment described herein may eliminate or minimize the dark portions generated in the image formed by the light emitted from the out-coupler 19 of the waveguide 10 even when the diameter of the light emitted from the projecting part 5 is smaller than the thickness of the waveguide 10. Therefore, since it is not necessary to use a separate optical element to make the diameter of the light incident on the waveguide 10 equal to or greater than the thickness of the waveguide 10, the size of the projecting part 5 may be reduced.

Therefore, the wearable display apparatus using the waveguide according to an exemplary embodiment may be reduced in size compared with the wearable display apparatus using the waveguide according to the prior art.

While exemplary embodiments have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An optical system comprising:
   a light source configured to output light;
   a first waveguide configured to guide the light;
   a first transmissive reflective layer provided on a top surface of the first waveguide and configured to reflect a first portion of the light incident thereon and to transmit a second portion of the light incident thereon;
   a second waveguide provided on a top surface of the first transmissive reflective layer and configured to guide the second portion of the light;
   a second transmissive reflective layer provided on a top surface of the second waveguide and configured to reflect a first sub-portion of the second portion of the light incident thereon, toward the first transmissive reflective layer, and to transmit a second sub-portion of the second portion of the light incident thereon;
   a third waveguide provided on a top surface of the second transmissive reflective layer and configured to guide the second sub-portion of the second portion of the light;
   an in-coupler provided on a bottom surface of the first waveguide and configured to guide the light output by the light source into the first waveguide; and
   an out-coupler provided on one of the first waveguide and the third waveguide and configured to emit the light incident thereon to an outside,
   wherein the first transmissive reflective layer covers an entirety of the top surface of the first waveguide, and the second transmissive reflective layer covers less than an entirety of the top surface of the second waveguide,
   wherein an entirety of the in-coupler is overlapped by the first transmissive reflective layer and the second transmissive reflective layer,
   wherein an entirety of the out-coupler is overlapped by the first transmissive reflective layer, without being overlapped by the second transmissive reflective layer, and
   wherein the out-coupler is spaced apart from the in-coupler by more than a size of the in-coupler, and the light incident on the in-coupler moves to the first transmissive reflective layer.

2. The optical system of claim 1, wherein the out-coupler is provided on the first waveguide.

3. The optical system of claim 1, wherein the in-coupler comprises an inclined surface formed at one end of the first waveguide.

4. The optical system of claim 1, wherein the in-coupler comprises a prism provided in the first waveguide.

5. The optical system of claim 1, wherein the in-coupler and the out-coupler each comprise one of a diffractive optical element, a polarization selective coating, and a prism.

6. A method of guiding light in an optical system that includes a first waveguide, a first transmissive reflective layer formed to cover a top surface of the first waveguide, a second waveguide, a second transmissive reflective layer formed to cover a top surface of the second waveguide, a third waveguide, an in-coupler, and an out-coupler, the method of guiding the light comprising:
   transmitting the light through the in-coupler, thereby causing the light to be incident on the first transmissive reflective layer;
   reflecting, by the first transmissive reflective layer, a first portion of the light incident on the first transmissive reflective layer to be incident on the first waveguide,
   transmitting, through the first transmissive reflective layer, a second portion of the light incident on the first transmissive reflective layer to the second transmissive reflective layer via the second waveguide;
   causing the first portion of the light incident on the first waveguide to be totally internally reflected within the first waveguide and thereby incident on the first transmissive reflective layer;
   reflecting, by the second transmissive reflective layer, a first sub-portion of the second portion of the light incident on the second transmissive reflective layer to be incident on the first transmissive reflective layer,
   transmitting, through the second transmissive reflective layer, a second sub-portion of the second portion of the light incident on the second transmissive reflective layer to the third waveguide;

causing the second sub-portion of the second portion of the light incident on the third waveguide to be totally internally reflected within the third waveguide and thereby incident on the second transmissive reflective layer;

causing the light, including the first portion and the second portion of the light, traveling through the first waveguide, the second waveguide, and the third waveguide to be refracted by the out-coupler and thereby be emitted from the optical system, wherein the first transmissive reflective layer covers an entirety of the top surface of the first waveguide, and the second transmissive reflective layer covers less than an entirety of the top surface of the second waveguide, wherein an entirety of the in-coupler is overlapped by the first transmissive reflective layer and the second transmissive reflective layer, wherein an entirety of the out-coupler is overlapped by the first transmissive reflective layer, without being overlapped by the second transmissive reflective layer, and wherein the out-coupler is spaced apart from the in-coupler by more than a size of the in-coupler, and the light incident on the in-coupler moves to the first transmissive reflective layer.

7. The method of guiding the light of claim 6, wherein the transmitting the light through the in-coupler comprises causing the light transmitted through the in-coupler to be totally internally reflected by at least one of the first waveguide and the third waveguide.

8. A wearable display apparatus comprising:
a projecting part configured to emit light forming an image; and
an optical system configured to guide the light emitted from the projecting part,
wherein the optical system comprises:
  a first waveguide configured to guide the light;
  a first transmissive reflective layer provided on a top surface of the first waveguide and configured to reflect a first portion of the light incident thereon and to transmit a second portion of the light incident thereon, the first transmissive reflective layer formed to cover the top surface of the first waveguide;
  a second waveguide provided on a top surface of the first transmissive reflective layer and configured to guide the second portion of the light;
  a second transmissive reflective layer provided on a top surface of the second waveguide and configured to reflect a first sub-portion of the second portion of the light incident thereon, toward the first transmissive reflective layer, and to transmit a second sub-portion of the second portion of the light incident thereon, the second transmissive reflective layer formed to cover the top surface of the second waveguide;
  a third waveguide provided on a top surface of the second transmissive reflective layer and configured to guide the second sub-portion of the second portion of the light;
  an in-coupler provided on the first waveguide and configured to guide the light emitted from the projecting part into the first waveguide; and
  an out-coupler provided on one of the first waveguide and the third waveguide and configured to emit the light incident thereon to an outside,
wherein the first transmissive reflective layer covers an entirety of the top surface of the first waveguide, and the second transmissive reflective layer covers less than an entirety of the top surface of the second waveguide,
wherein an entirety of the in-coupler is overlapped by the first transmissive reflective layer and the second transmissive reflective layer,
wherein an entirety of the out-coupler is overlapped by the first transmissive reflective layer, without being overlapped by the second transmissive reflective layer, and
wherein the out-coupler is spaced apart from the in-coupler by more than a size of the in-coupler, and the light incident on the in-coupler moves to the first transmissive reflective layer.

9. The wearable display apparatus of claim 8, wherein the first transmissive reflective layer is provided in a position that overlaps with a position of the in-coupler.

10. The wearable display apparatus of claim 8, wherein the out-coupler is provided on the first waveguide.

11. The wearable display apparatus of claim 8, wherein the wearable display apparatus comprises one of a head mounted display and smart glasses.

12. The optical system of claim 1, wherein the first transmissive reflective layer is configured to:
  transmit, to the second waveguide, the second portion of the light that is incident thereon from the first waveguide,
  reflect, to the first waveguide, the first portion of the light that is incident thereon from the first waveguide,
  transmit, to the first waveguide, a first part of the first sub-portion of the second portion of the light that is incident thereon from the second waveguide, and
  reflect, to the second waveguide, a second part of the first sub-portion of the second portion of the light that is incident thereon from the second waveguide.

* * * * *